June 29, 1943.  D. BERMAN  2,322,912
SANITARY MEASURING DEVICE
Filed Feb. 25, 1942
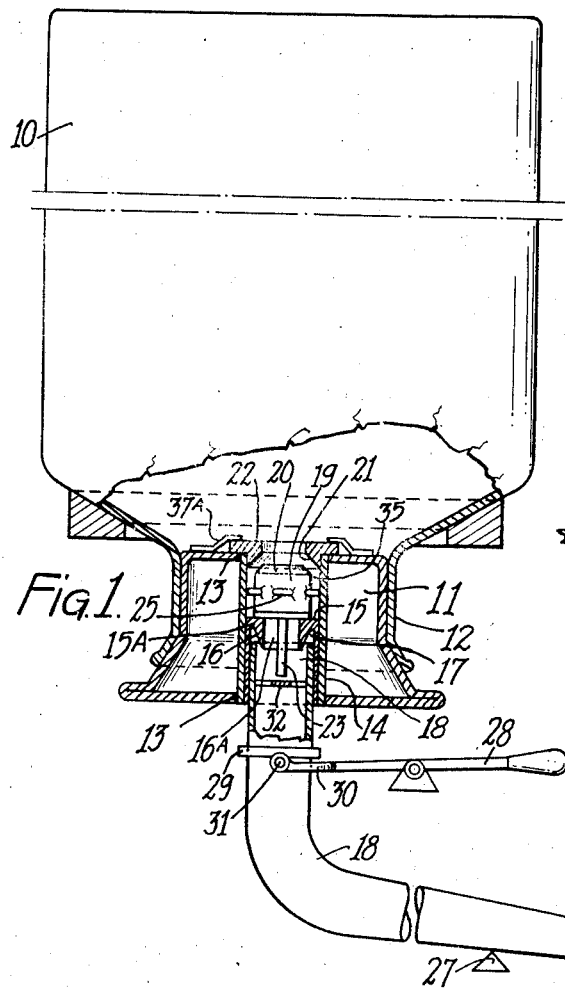
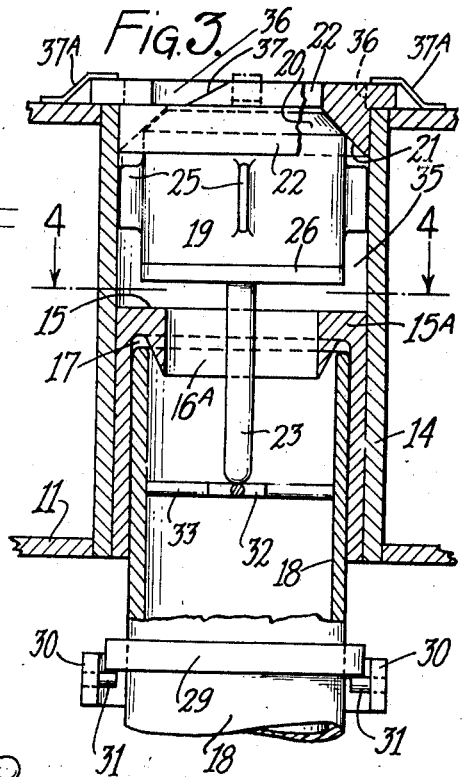
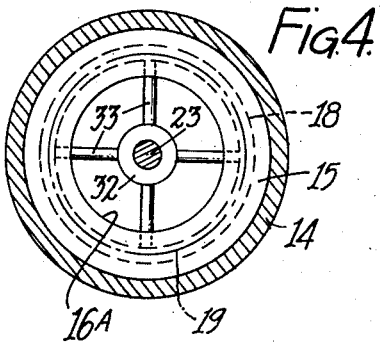
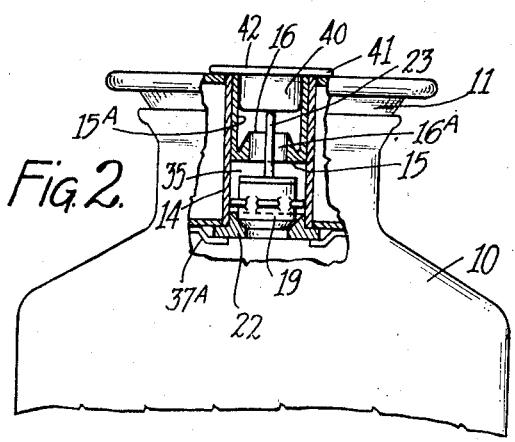
INVENTOR.
DAVID BERMAN Patented June 29, 1943

2,322,912

UNITED STATES PATENT OFFICE 2,322,912

SANITARY MEASURING DEVICE

David Berman, Brooklyn, N. Y.

Application February 25, 1942, Serial No. 432,183

3 Claims. (Cl. 221—67)

This invention relates to measuring devices of a sanitary nature and in particular to those employed in dispensing fluids such as milk or the like which are consumed and must be free from dust, contamination and handling during shipment and sale.

In the milk industry, particularly the selling of the same at retail, stringent laws are in effect to prevent the sale of the fluid except through the medium of approved equipment and to this end I have provided a novel valve mechanism, more properly termed a sanitary measuring device, which will meet with the approval of the various sanitary codes and rules and which, due to its construction can be thoroughly sterilized, has few parts, can be readily manipulated to dispense a given quantity of fluid and which can be quickly set up for use or dismantled at will.

A further object of the invention is to provide a dispensing device of the character referred to which may be incorporated in the cover or stopper of the receptacle and which will serve as a seal when the container is being shipped and which when the container is set up for dispensing the contents thereof, can be manipulated to automatically measure a given quantity of the fluid and dispense a like quantity without adjustment on the part of the operator. Another important object of my invention is the provision of a device which is particularly adapted to milk cans and which is contained within the closure member thereof in such a way that the can may be quickly set up for dispensing the milk and will not leak or drip or permit dust or dirt to enter the parts of the device that are manipulated to dispense the milk, this being an important feature of the invention inasmuch as no portion of the mechanism that contacts the milk may be open to atmosphere.

Changes and variations may be made in the construction shown and described without departing from the principles of the invention or sacrificing its chief advantages; hence such invention is not to be confined solely to the structures shown in the accompanying drawing, in which Figure 1 is a view of a milk can or other fluid holding receptacle in inverted or contents dispensing position, part being broken away to show the interior construction of the valve mechanism, Figure 2 is a view in part, of the container illustrated in Figure 1, in upright position showing the sealing of the receptacle in shipping, Figure 3 is an enlarged section in elevation of the dispensing device in inverted position showing more fully the arrangement of the parts and operation thereof, and Figure 4 is a section taken on the line 4—4 of Figure 3 showing the shape of the parts of the valve member.

Referring to the drawing in detail, 10 indicates a container such, for instance, as a milk can in which is held milk to be dispensed and which has been properly treated as by sterilizing or pasteurizing and is ready for consumption, the can being closed with the usual plug like cover 11 which seats in the neck 12 of the can and for the purpose of illustration may be made of stainless steel or Monel metal or other non-corroding material and which consists of a suitably shaped member hereinafter referred to as the cover, having a central bore 13 in which is secured as by welding or the like, a sleeve 14. The sleeve is open ended and its ends are flush with the inner and outer surfaces of the cover 11. In the outer end of the sleeve 14, there is secured a guide cup of substantially tubular formation having an inner valve seat 15, a central bore or opening 16A which is bounded by a flange 16, which extends peripherally thereof and forms with the wall of the guide cup an annular trough or groove 17.

The tubular portion of the cup is arranged to receive with close sliding fit, the upper end of a dispensing pipe or tube 18, which upper end extends within the trough 17 formed by the depending flange 16 so that as the fluid comes through the guide cup, it is led down into the pipe 18 without touching the upper edge of the latter. The flat valve seat 15 formed by the upper side of the cup 15A (when the device is in dispensing position as shown in Figure 1) provides a support for the valve 19 which is cylindrical in shape, preferably solid to provide weight, and is shaped at its upper end to provide a valve edge 20 which coacts with the valve seat 21 of a valve ring 22 secured in the upper end of the sleeve 14. The valve 19 is provided with a central depending valve stem 23 which passes down through the guide cup 15A, and with radial guide bosses or blades 25 which maintain the valve centrally of the sleeve 14 in its movements therein.

The valve is further provided with a disk 26 of soft rubber or other sealing material that will prevent leakage of the fluid beneath the valve when the same rests on the flat valve seat 15. The fluid dispensing pipe 18 may extend to a point remote from the receptacle and be mounted at its outer end on a support that, as indicated at 27, will permit free movement of the pipe to compensate for its vertical movement under the influence of an operating member or lever 28 which may be actuated by mechanical, electrical or manual means to raise the pipe 18, through cooperation of the bifurcated end 30 of the lever, with a ring 29 attached to the pipe and engaged by pins 31 in the ends of the fork arms of said lever 28.

The pipe 18, near its inner end is provided with a lift disk 32, supported from the wall of the pipe by the arms 33 in the median line of the pipe, and arranged to engage the lower end of the valve stem to raise the valve and force it against the valve seat 21 of the valve ring 22 to cut off the flow of fluid to the valve chamber 35. This valve chamber 35 is the space occupied by the valve 19 and is defined by the valve ring 22 and the valve seat 15 and defines a cubic measure of fluid. When the valve is in the position shown in Figure 1, a definite amount of fluid is in the valve chamber and when the valve is suddenly raised against the upper valve seat 21, no more fluid can enter the valve chamber 35 and what is in there, will flow down through the dispensing pipe 18. The valve ring 22 is removably positioned in the end of the pipe 14 or sleeve, and is provided with peripheral openings 36, one of the edges of which 37, is bevelled to lift a clip arm 37A as the ring is revolved to fix it in place, the clip arms engaging the upper surface of the ring as shown in Figure 3.

It will be noted that the operating lever 28 has no fixed connection to the pipe 18 and in any milk dispensing machine the pipe as well as the container and the cover will all be removed together and taken to the sterilizing plant after the can is empty and before the can or pipe or valve is used again. This provides in a dispensing device a means of maintaining the parts clean and sterile in accordance with the requirements of the sanitary laws and in my novel construction, it is evident that no contamination of the contents of the container is possible because the latter is not open to atmosphere or are any of the parts uncovered or manipulated by human touch directly. When the receptacle is filled and the contents have been pasteurized in the case of milk and the valve mechanism sterilized, the cover is placed in the can and then the cover plug or plate 40 is forced frictionally into the end of the sleeve 14 to seal the container. Removal of the cover plate or plug 40 is facilitated by the flange 41 of its disk portion 42. Any means may be employed to seal the cover plug 40 in place to prevent unauthorized tampering therewith. The valve 19 may have guide blades 25 of any desired shape and disposed vertically as in Figures 1 and 2 or horizontally as in Figure 3. The plug 40, it will be noted may, as shown in Figure 2, be employed to engage the valve stem 23 to hold the valve 19 in place on its seat 22 to seal the receptacle.

Having described my invention, what I claim is:

1. In a sanitary measuring device, in combination, a receptacle, a cover constituting a stopper removable from the receptacle and presenting a passage therein, valve seat members in said passage spaced to form a fluid measuring chamber, a valve slidably mounted in the chamber between the valve seat members and having a depending stem, one of the valve seat members constituting a guide, a pipe having an end slidably fitted in said guide, a perforated disk fixed in the pipe for engagement with the valve stem and means for moving the pipe to drop and raise the valve alternately, to respectively fill the chamber with fluid from the receptacle and discharge fluid from the chamber.

2. In a sanitary measuring device, in combination, a fluid receptacle having a collared neck portion, a hollow stopper removably postioned in said neck portion and presenting a central tubular chamber constituting a fluid discharge passage from the receptacle, spaced inner and outer valve seat members in the chamber, the outer seat member having a depending flange forming a trough, a valve in the chamber between said valve seat members having a depending stem passing through said flanged valve seat member, a spout pipe having an end slidable in said chamber and surrounding said flange, a perforated disk in the pipe for engaging the valve stem and means for moving the pipe to alternately drop and raise the valve, to fill the chamber with fluid from the receptacle and discharge fluid from the chamber, respectively.

3. In a sanitary measuring device, in combination, a fluid receptacle having a collared neck portion, a hollow stopper removably positioned in said neck portion and presenting a central tubular chamber constituting a fluid discharge passage from the receptacle, spaced inner and outer valve seat members in the chamber, the outer seat member having a depending flange forming a trough, a valve in the chamber between said valve seat members having a depending stem passing through said flanged valve seat member, and a cover plug in the end of said chamber engaging the valve stem to hold the valve against said inner valve seat member to prevent passage of fluid from the receptacle to the tubular chamber.

DAVID BERMAN.